United States Patent
Pell et al.

(10) Patent No.: US 12,305,499 B2
(45) Date of Patent: May 20, 2025

(54) SURVEY INSTRUMENT

(71) Applicant: REFLEX INSTRUMENTS ASIA PACIFIC PTY LTD, Balcatta (AU)

(72) Inventors: Christopher Pell, Atascadero, CA (US); Erik D. Gutterud, Grover Beach, CA (US); Cory Wilson, Atascadero, CA (US); Christopher Thomas Koplan, Atascadero, CA (US); Gregory W. Hollister, San Luis Obispo, CA (US); Dennis Buckley, Paso Robles, CA (US); Timothy M. Price, Templeton, CA (US)

(73) Assignee: Reflex Instruments Asia Pacific Pty Limited, Perth WA (AU)

( * ) Notice: Subject to any disclaimer, the term of this patent is extended or adjusted under 35 U.S.C. 154(b) by 0 days.

(21) Appl. No.: 17/607,365

(22) PCT Filed: Apr. 29, 2020

(86) PCT No.: PCT/IB2020/000349
§ 371 (c)(1),
(2) Date: Oct. 28, 2021

(87) PCT Pub. No.: WO2020/222043
PCT Pub. Date: Nov. 5, 2020

(65) Prior Publication Data
US 2022/0220841 A1 Jul. 14, 2022

Related U.S. Application Data (60) Provisional application No. 62/841,214, filed on Apr. 30, 2019.

(51) Int. Cl.
*G01C 15/00* (2006.01)
*E21B 47/017* (2012.01)
(Continued)

(52) U.S. Cl.
CPC .......... *E21B 47/017* (2020.05); *E21B 47/022* (2013.01); *F16M 11/123* (2013.01);
(Continued)

(58) Field of Classification Search
CPC .... E21B 47/017; E21B 47/022; E21B 47/024; F16M 11/123; F16M 11/18; G01C 15/00;
(Continued)

(56) References Cited

U.S. PATENT DOCUMENTS 3,587,175 A * 6/1971 Armistead ............ E21B 47/022
33/312
4,021,774 A * 5/1977 Asmundsson ....... G01V 11/002
175/45
(Continued)

FOREIGN PATENT DOCUMENTS

AU 2012318276 A8 3/2016
NO 342849 B1 * 8/2018 ........... E21B 47/022
(Continued)

OTHER PUBLICATIONS

An Office Action issued by the Chilean Intellectual Property Office on Nov. 22, 2023, which corresponds to Chilean Patent Application No. 2021-02860 and is related to U.S. Appl. No. 17/607,365.
(Continued)

*Primary Examiner* — Yaritza Guadalupe-McCall
(74) *Attorney, Agent, or Firm* — Studebaker Brackett PLLC (57) ABSTRACT

A sensor gimbal system employs one sensor gimbal on which a sensor is mounted. The sensor gimbal is configured to orient a sensitive axis of the sensor with respect to a survey instrument. A sensor motor assembly is configured to rotate the sensor gimbal between a first hard stops and a second hard stop. A dowel pin extends from the mating bevel gear to engage the hard stops. A flex circuit has a flex cable
(Continued)

from a sensor PCB, on which the sensor is mounted, to an electronic circuit board.

19 Claims, 13 Drawing Sheets

(51) Int. Cl.
*E21B 47/022* (2012.01)
*F16M 11/12* (2006.01)
*F16M 11/18* (2006.01)
*G01C 19/5712* (2012.01)

(52) U.S. Cl.
CPC ............. *F16M 11/18* (2013.01); *G01C 15/00* (2013.01); *G01C 19/5712* (2013.01)

(58) Field of Classification Search
CPC ...... G01C 19/5712; G01C 21/18; G01C 9/06; G01C 19/34; H01R 35/00
See application file for complete search history.

(56) References Cited

U.S. PATENT DOCUMENTS

| | | | | |
|---|---|---|---|---|
| 4,454,756 A * | 6/1984 | Sharp | ............... | E21B 47/022 |
| | | | | 702/6 |
| 4,987,684 A * | 1/1991 | Andreas | ............... | E21B 47/022 |
| | | | | 33/304 |
| 6,895,678 B2 * | 5/2005 | Ash | ............... | E21B 47/013 |
| | | | | 33/313 |
| 8,456,159 B2 * | 6/2013 | Polzer | ............... | G01R 33/022 |
| | | | | 33/361 |
| 8,600,115 B2 * | 12/2013 | Liu | ............... | G01V 1/50 |
| | | | | 33/304 |
| 8,931,326 B1 * | 1/2015 | Fowler | ............... | G01C 17/38 |
| | | | | 73/1.76 |
| 9,714,548 B2 | 7/2017 | Price et al. | | |
| 2005/0022402 A1 | 2/2005 | Ash et al. | | |
| 2005/0126022 A1 * | 6/2005 | Hansberry | ............ | E21B 47/022 |
| | | | | 33/313 |
| 2013/0118731 A1 * | 5/2013 | Parfitt | ............... | G01P 1/02 |
| | | | | 166/250.01 |
| 2015/0052988 A1 | 2/2015 | Price et al. | | |
| 2015/0204667 A1 * | 7/2015 | Fowler | ............... | G01C 21/188 |
| | | | | 33/355 R |
| 2016/0145997 A1 * | 5/2016 | Van Steenwyk | ...... | E21B 47/022 |
| | | | | 33/304 |
| 2017/0306747 A1 * | 10/2017 | Parfitt | ............... | E21B 41/00 |
| 2022/0220841 A1 * | 7/2022 | Pell | ............... | E21B 47/024 |

FOREIGN PATENT DOCUMENTS

| | | | | |
|---|---|---|---|---|
| WO | WO-2011146986 A1 * | 12/2011 | ............ | B23Q 16/12 |
| WO | 2016/179304 A1 | 11/2016 | | |

OTHER PUBLICATIONS

Third Party Observations filed in the European Patent Office on Sep. 21, 2023, in connection wiith EP 20798369.3 which is related to U.S. Appl. No. 17/607,365.

International Search Report issued in PCT/IB2020/000349; mailed Jul. 23, 2020.

The extended European Search Report issued by the European Patent Office on May 3, 2023, which corresponds to EP 20798369.3 and is related to U.S. Appl. No. 17/607,365.

\* cited by examiner

SURVEY INSTRUMENT

REFERENCES TO RELATED APPLICATIONS

This application claims priority of U.S. provisional application Ser. No. 62/841,214 filed on Apr. 30, 2019, having a common assignee with the present application, the disclosure of which is incorporated herein by reference.

BACKGROUND

Field

This invention relates generally to the field of borehole surveying instruments and more particularly to an attitude survey instrument with a rotating sensor gimbal.

Description of the Related Art

In the field of borehole surveying, the measurement of azimuth while in the borehole at all a nominal borehole azimuth and dip angles is highly desirable. One key technical requirement to achieve measurement in all attitudes is to remove systematic bias from all sensor measurements. One method of doing this is by rotating the sensors in multiple rotational positions to make the systematic bias observable and therefore measurable. Historically and for practical mechanical reasons, sensor rotation in a small diameter borehole is easily done for sensors that have their sensitive axis cross wise to the borehole and very difficult for sensors that nominally have sensitive measurements along the borehole.

It is therefore desirable to provide a means for rotating a sensor and measuring systematic bias of the sensor ultimately providing a bias corrected measurement along the borehole axis.

SUMMARY

In one aspect the present invention may be said to comprise a sensor gimbal system comprising: a sensor gimbal with a sensor PCB and a sensor, said sensor gimbal configurable to rotationally orient a sensitive axis of the sensor with respect to the sensor gimbal system; a sensor motor to rotate the sensor gimbal between a first orientation and a second orientation; and a flex circuit between the sensor PCB and an electronic circuit board, wherein the flex circuit is routed to reduce signal distortion and/or kinking during rotation.

Optionally the flex circuit is routed on a curved path.

Optionally the sensor gimbal system further comprises a curved path frame to route the flex circuit.

Optionally the sensor gimbal system according further comprises shielding on one or both sides of the flex circuit.

Optionally the sensor is mounted using epoxy or a silicon adhesive (such as silicon epoxy to isolate vibrations and stresses from rotation of the sensor gimbal.

Optionally the flex circuit, curved path routing, shielding and/or silicon adhesive reduce bias.

Optionally the sensor gimbal system is mounted on an IMU gimbal, tool chassis of a survey instrument, or an outer rotating assembly.

Optionally the sensor comprises a MEMs gyro.

Optionally the sensor gimbal system further comprises a sub-chassis on which the sensor is mounted with an epoxy, or a silicon adhesive (such as silicon epoxy), the sub-chassis attached to a gimbal frame of the sensor gimbal.

Optionally the flex circuit incorporates a substantially 360° encirclement of the sensor and sensor PCB in the unrotated position, the flex circuit received in a track in a sub-chassis engaging the sensor PCB to a sensor gimbal frame.

Optionally a companion track is present in the sensor gimbal frame for alignment of the flex circuit.

In another aspect the present invention may be said to comprise a method for manufacture of a rotating gimbal assembly according to any one of the statements above, the method comprising: soldering the MEMs gyro sensor to the sensor PCB; epoxying or silicon adhering (e.g. using such as silicon epoxy) the soldered sensor PCB to the sub-chassis; attaching the sub-chassis to the gimbal frame; and, attaching the rotating gimbal frame to the tool housing and calibrating the rotating gimbal.

In another aspect the present invention may be said to comprise a survey instrument comprising a sensor gimbal system according to any statement above.

Optionally the survey instrument further comprises an IMU gimbal, wherein the sensor gimbal system is mounted on the IMU gimbal.

Optionally the IMU gimbal is rotatable about a longitudinal axis of the survey instrument.

Optionally the survey instrument has a tool chassis, and the sensor gimbal system is mounted on the tool chassis.

The embodiments disclosed herein provide a sensor gimbal system employing one sensor gimbal on which a sensor is mounted. The sensor gimbal is configured to orient a sensitive axis of the sensor along either an Y axis or a Z axis of an IMU gimbal or to rotate the sensitive axis of the sensor 180° for positive and negative alignment with the Z axis of a survey tool. A sensor motor assembly is configured to rotate the sensor gimbal between a first hard stops and a second hard stop. In a first implementation, when rotated against the first hard stop the sensor sensitive axis is coincident with the Y axis of the IMU gimbal and when rotated against the second stop the sensitive axis of the sensor is coincident with the IMU Z axis. In a second implementation when rotated against the first hard stop the sensor sensitive axis is aligned with the +Z axis and when rotated against the second hard stop the sensor sensitive axis is aligned with the −Z axis of the survey instrument. A dowel pin extends from the sensor gimbal to engage the hard stops. A flex circuit has a flex cable from a sensor PCB, on which the sensor is mounted, to an electronic circuit board.

Also described herein is a sensor gimbal system comprising: one sensor gimbal on which a sensor is mounted, said sensor gimbal configured to rotationally orient a sensitive axis of the sensor with respect to a survey instrument; a sensor motor assembly configured to rotate the sensor gimbal between a first hard stop and a second hard stop; a dowel pin extending from the mating bevel gear configured to engage the hard stops; and a flex circuit having a flex cable from a sensor PCB to an electronic circuit board.

Optionally the flexible length of the flex circuit is predetermined with a curved path frame ensuring that the flex circuit cable does not kink.

Optionally the sensor gimbal system further comprises a sub-chassis on which the sensor is mounted with an epoxy, the sub-chassis attached to a gimbal frame of the sensor gimbal.

Optionally the sensor comprises a MEMs gyro.

Optionally the IMU gimbal is rotatable about a longitudinal axis of the survey instrument in which the IMU gimbal is mounted and the sensor gimbal is mounted to the IMU gimbal.

Optionally the sensor motor rotates a bevel drive gear that engages a mating bevel gear to rotate the sensor gimbal, wherein when rotated against the first hard stop the sensor sensitive axis is coincident with a first axis of the IMU gimbal and when rotated against the second stop the sensitive axis of the sensor 24 is coincident with a second axis of the IMU gimbal.

Optionally the sensor motor rotates a toothed drive belt engaging a mating toothed gear to rotate the sensor gimbal between the first and second hard stops.

Optionally the sensor gimbal is mounted to a frame of the survey instrument.

Optionally the sensitive axis of the sensor is aligned with a Z axis of the survey instrument with the gimbal rotated to the first hard stop and rotated 180° with the gimbal rotated to the second hard stop.

Optionally the hard stops are adjustable.

Optionally the flex cable includes a layer of high magnetic permeability material on at least a portion of one side of the flex cable.

Optionally the flex cable includes a layer of high magnetic permeability material both sides of the flex cable.

Optionally the flex cable is routed along at least one curved path frame.

Optionally the flex cable incorporates a substantially 360° encirclement of the sensor and sensor PCB in the unrotated position, the flex cable received in a track in the sub-chassis engaging the sensor PCB to the sensor gimbal frame.

Optionally a companion track is present in the sensor gimbal frame for alignment of the flex cable.

Optionally the flex cable is adhesively engaged in the companion track.

Also described herein is a method for manufacture of a rotating gimbal assembly as described above, the method comprising: soldering the MEMs gyro sensor to the sensor PCB; epoxying the soldered sensor PCB to the sub-chassis; attaching the sub-chassis to the gimbal frame; and, attaching the rotating gimbal frame to the tool housing and calibrating the rotating gimbal.

Optionally the step of epoxying the sensor PCB to the sub-chassis employs a silicon epoxy.

BRIEF DESCRIPTION OF THE DRAWINGS

These and other features and advantages of the present invention will be better understood by reference to the following detailed description of exemplary embodiments when considered in connection with the accompanying drawings wherein.

DETAILED DESCRIPTION

Figures 1A, 1B:
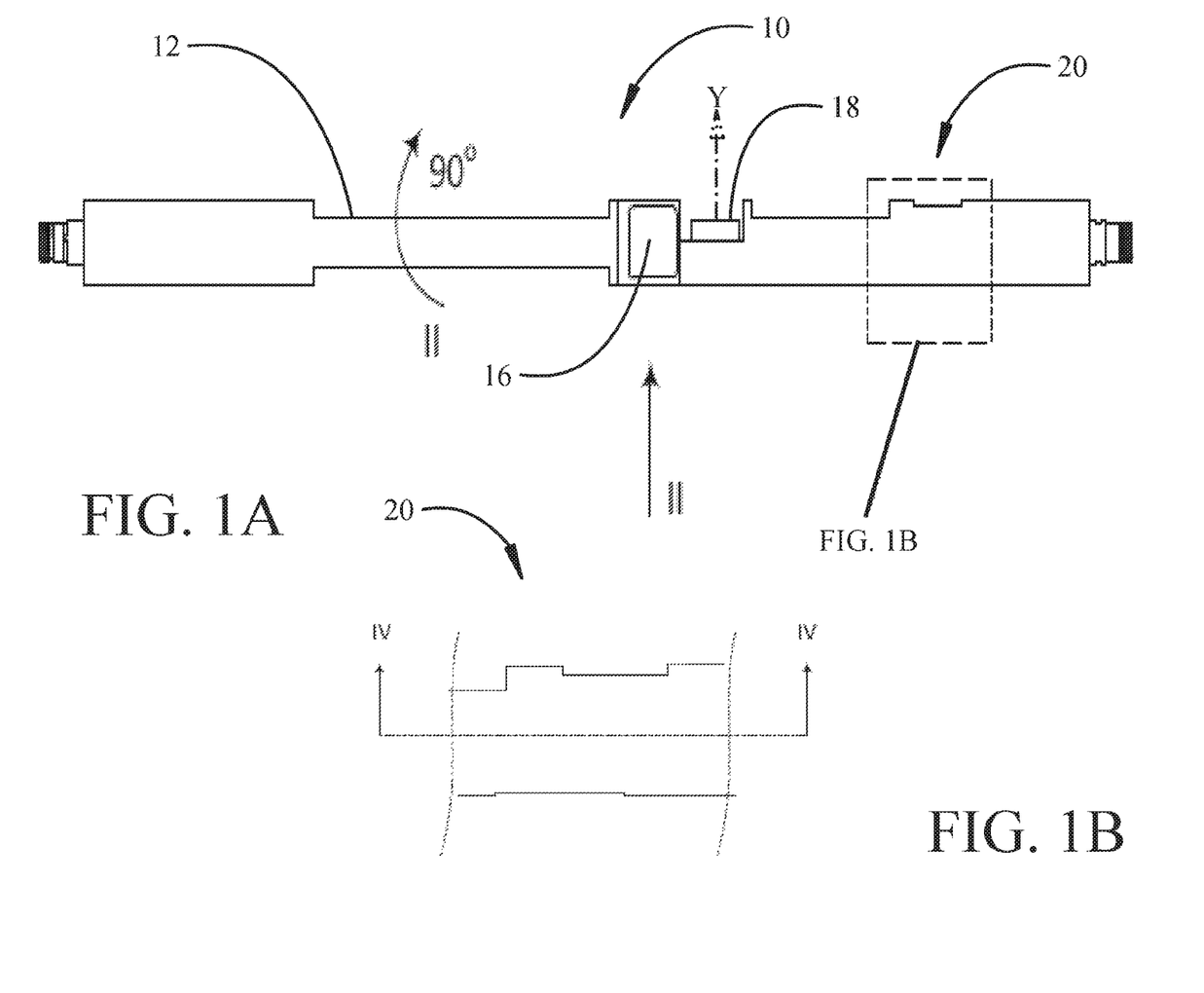
FIG. 1A is a side view depiction of an exemplary implementation the sensor gimbal in the attitude survey instrument.
FIG. 1B is an expanded view of a partial profile of the implementation of FIG. 1A.
Figure 2A:
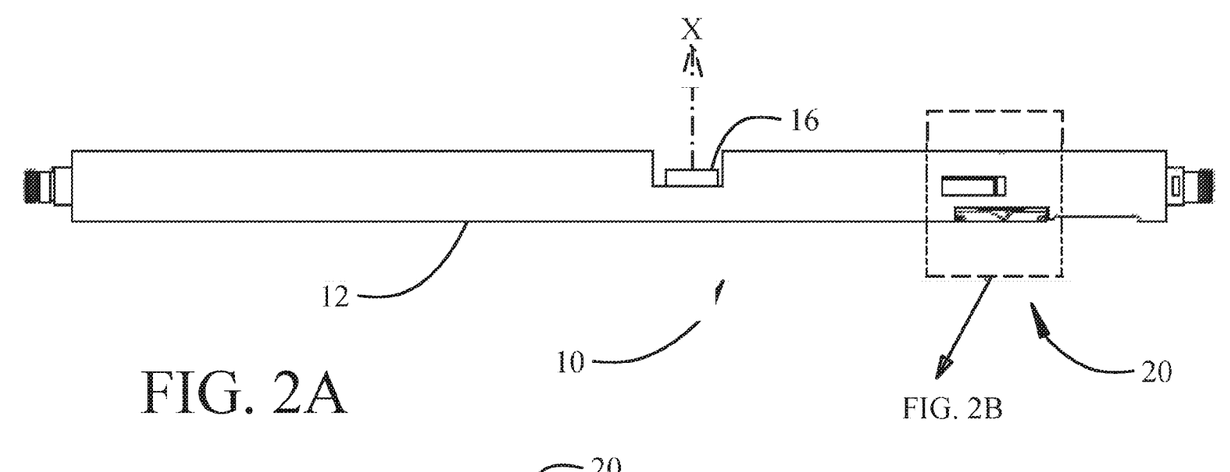
FIG. 2A is a top view depiction of the implementation of FIG. 1A with a partial case removal over the sensor section for clarity.
Figure 2B:
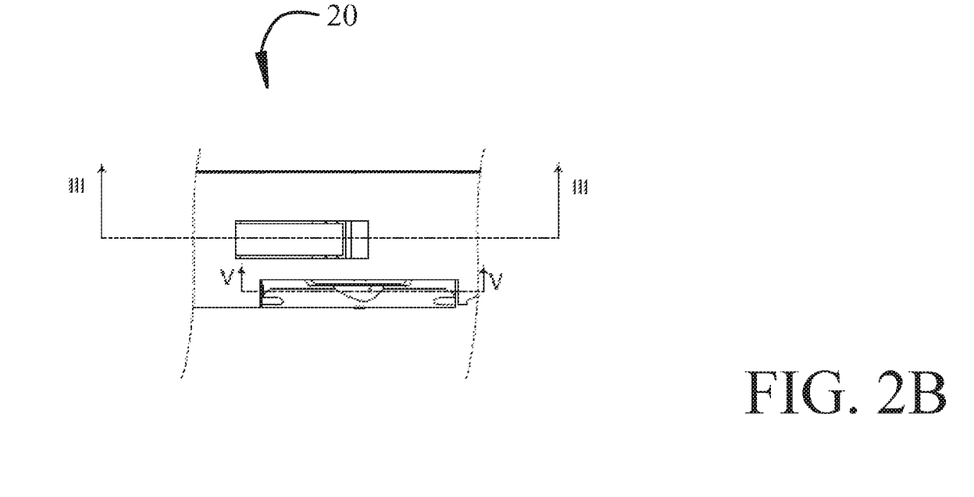
FIG. 2B is an expanded view of the partial case removal of the implementation of FIG. 2A.

Implementations shown in the drawings and described herein provide a downhole survey instrument having a combination of a sensor gimbal and an IMU gimbal to collect a series of measurements adapting the sensor gimbal configuration based on the sensor measurements taken in the sequence. The concept can be extended to include all the sensors in the IMU but the most practical and simplest configuration to implement is displayed in the drawings. A first example implementation is shown in FIGS. 1A and 2A, a survey instrument 10 includes an IMU gimbal unit 12, which may be implemented as disclosed in U.S. Pat. No. 9,714,548 issued Jul. 25, 2017 entitled Apparatus for Single Degree of Freedom Inertial Measurement Unit Platform Rate Isolation. The IMU gimbal 12 houses an accelerometer package 14, an X axis gyro 16 and a Y axis gyro 18. A sensor gimbal system 20 employing the exemplary implementation is also mounted in in the survey tool 10 on the IMU gimbal unit 12. Details of the sensor gimbal system 20 are shown in FIGS. 3A, 3B, 4 and 5.

Figure 3A:
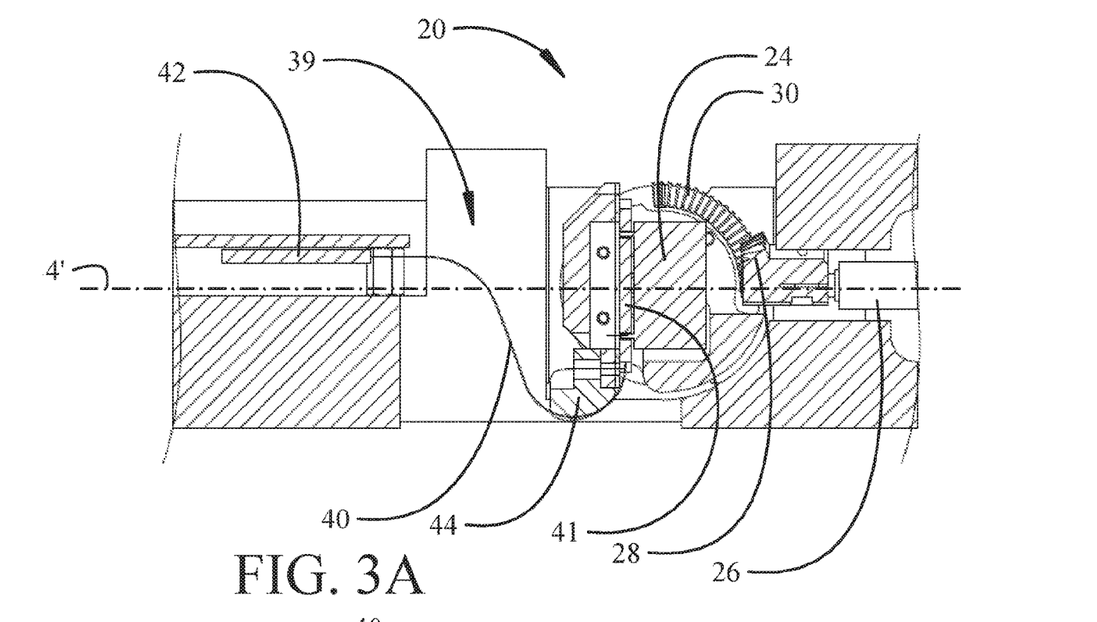
FIG. 3A is a sectioned depiction of the example implementation along lines III of FIG. 2B with the sensor gimbal in the unrotated position.
Figure 3B:
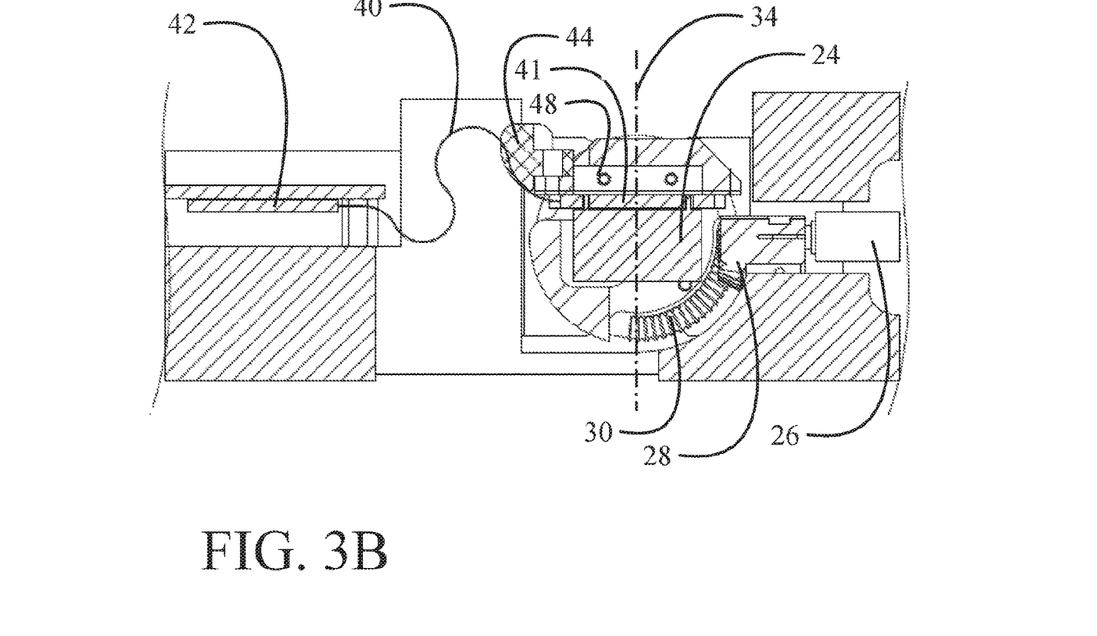
FIG. 3B is the sectioned depiction of the example implementation along lines III of FIG. 2B with the sensor gimbal in the rotated position.
Figure 4:
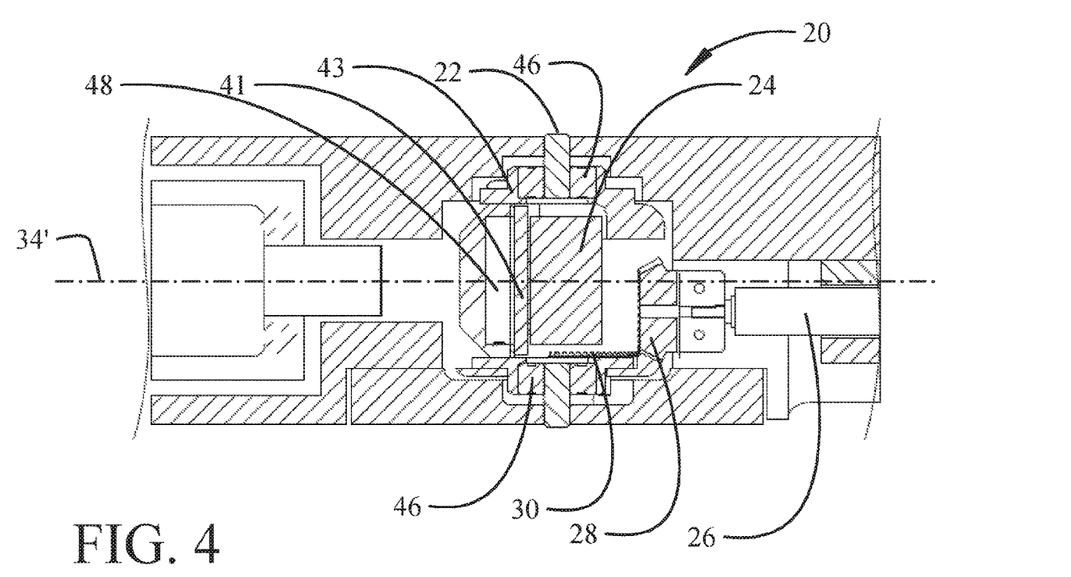
FIG. 4 is a sectioned depiction of the sensor gimbal along lines IV of FIG. 1B.

In the exemplary implementation, the sensor gimbal system 20 employs one sensor gimbal 22 on which a sensor 24 (that comprises a Z gyro in the example) is mounted. The sensor gimbal can orient the sensitive axis of the sensor 24 along either a first axis (the Y axis in the example implementation) or a second axis (the Z axis in the example implementation) of the IMU gimbal unit 12 as will be described in greater detail subsequently. A sensor motor assembly 26 rotates a bevel drive gear 28 that engages a mating bevel gear 30 on the sensor gimbal 22 to rotate the sensor gimbal between two hard stops providing a first position and a second position. When rotated against a first hard stop 32 (seen in FIG. 5) as shown in FIG. 3B, the sensor 24 sensitive axis 34 is coincident with the Y axis of the IMU designated IMU Mode 1. When rotated against a second stop 36 (seen in FIG. 5) the sensitive axis 34' of the sensor 24 is coincident with the IMU gimbal Z axis designated IMU Mode 2. A dowel pin 38 (seen in FIG. 5) extending from the mating bevel gear 30 engages the hard stops 32, 36. In the implementation shown, the hard stops 32, 36 are threaded screws allowing adjustment of the stop positions.

A flex circuit 39 provides the ability to move an analog signal from the sensor 24 through a flex cable 40 from a sensor PCB 41 to an electronic circuit board 42 without distorting the analog signal. The analog signal can distort due parasitic coupling to the gimbal chassis as well as other circuitry near the flex cable 40. For this reason, the flex cable is routed and managed during rotation and where possible to maintain a large and consistent clearances to minimize the magnitude of parasitic coupling and therefore analogue signal distortion. The flex cable 40 is managed to route along a curved path frame 44 ensuring that the flex cable 40 does not kink preventing mechanical and electrical failure of the conductors.

Figure 5:
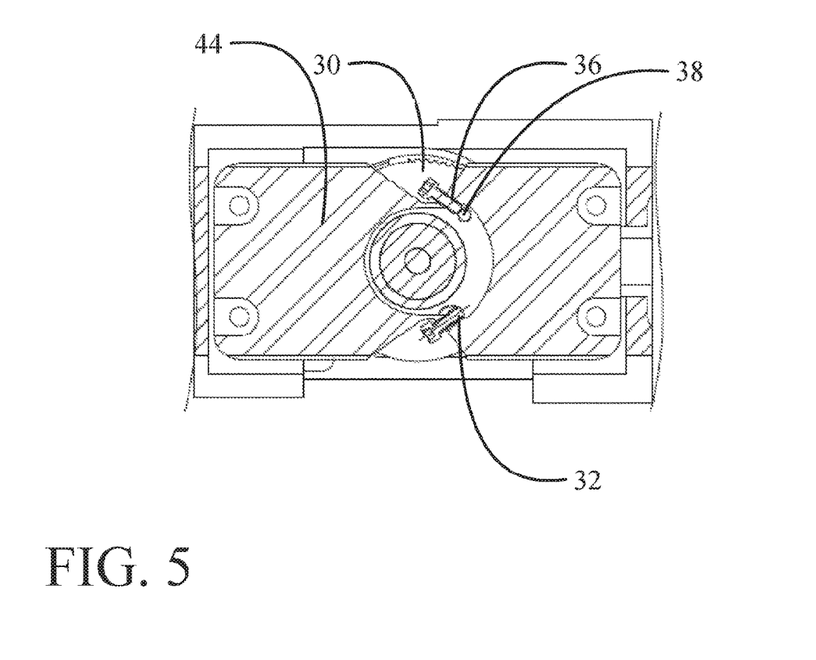
FIG. 5 is a sectioned depiction of the sensor gimbal along lines V of FIG. 2B.

For the exemplary implementation, bevel drive gear 28 and mating bevel gear 30 are machined with only the needed teeth for the rotating movement of 90 degrees. As seen in FIG. 5, the hard stops 32, 36 employ adjustment screws mounted in the gimbal system case 45 or case cover to calibrate the rotating gimbal to achieve desired performance. Preloaded angular contact ball bearings 46 are employed to support the sensor gimbal 22. The purpose of the bearings is to ensure low friction transfer to the rotating platform and high precision of rotation.

The sensor 24 has a nominal sensitive axis along the borehole. The implementation described herein provides the sensor gimbal 22 and the motor assembly 26, bevel drive gear 28 and mating bevel gear 30 to rotate sensitive axis 34 of the sensor 24 into directions both along the borehole as well as crosswise to the borehole. A sub-chassis 48 on which the sensor 24 is mounted on the sensor gimbal 22, the support structure for rotation including the bearings 46, the motor assembly 26, bevel drive gear 28 and mating bevel gear 30 to drive the gimbal, precision hard stops 32, 36 to define the rotational positions, and the flex cable 40 used to connect the electrical signals from the sensor 24 to the larger instrument assembly provide the rotating sensor gimbal system 20 for bias elimination.

The sensor gimbal system 20 is mounted on board the IMU gimbal unit 12, which is capable of a 360° rotation about a longitudinal axis of the survey instrument 10. An initial 90° rotation of the sensor gimbal 22 brings the sensor 24 orthogonal to the rotation of the IMU gimbal unit 12. The IMU gimbal unit 12 may then be rotated by 180° for bias calculation.

The sensor 24 used can be a gyroscope, an accelerometer, a magnetometer or a combination of more than one of these types of sensors. The preferred embodiment uses a MEMS gyroscope, and\or a MEMS accelerometer mounted on the sensor gimbal 22. But the implementation is not limited to these devices. A silicon adhesive is used to attach the sensor 24 to the sub-chassis 48 to ensure vibration and stresses from rotation of the sensor gimbal 22 is isolated from the MEMs gyro. Additionally, the sensor is mounted to the flex circuit with the flex circuit attached to the sub-chassis with silicon adhesive.

Figure 6A:
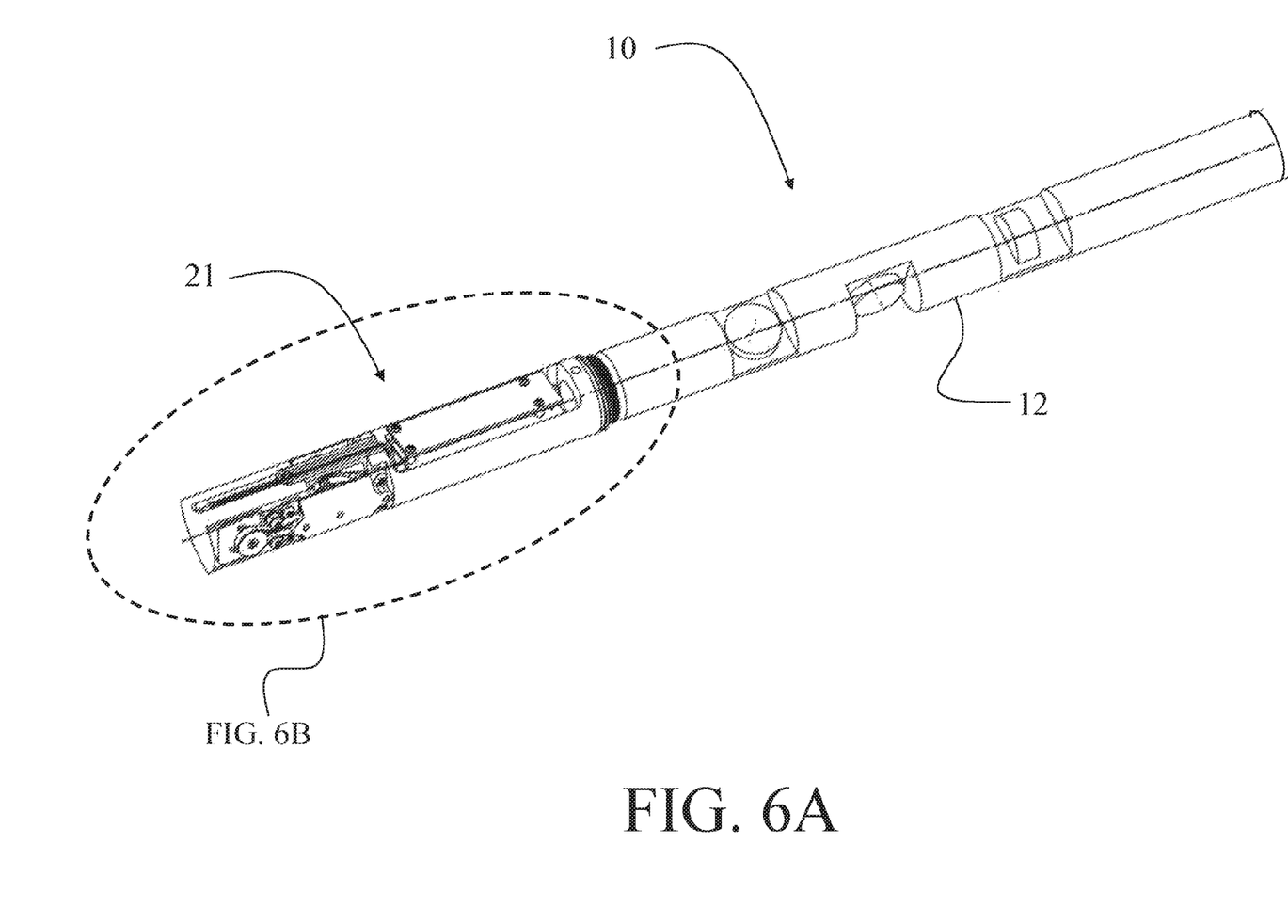
FIG. 6A is a pictorial representation of a second implementation of the sensor gimbal system in the attitude survey instrument.
Figure 6B:
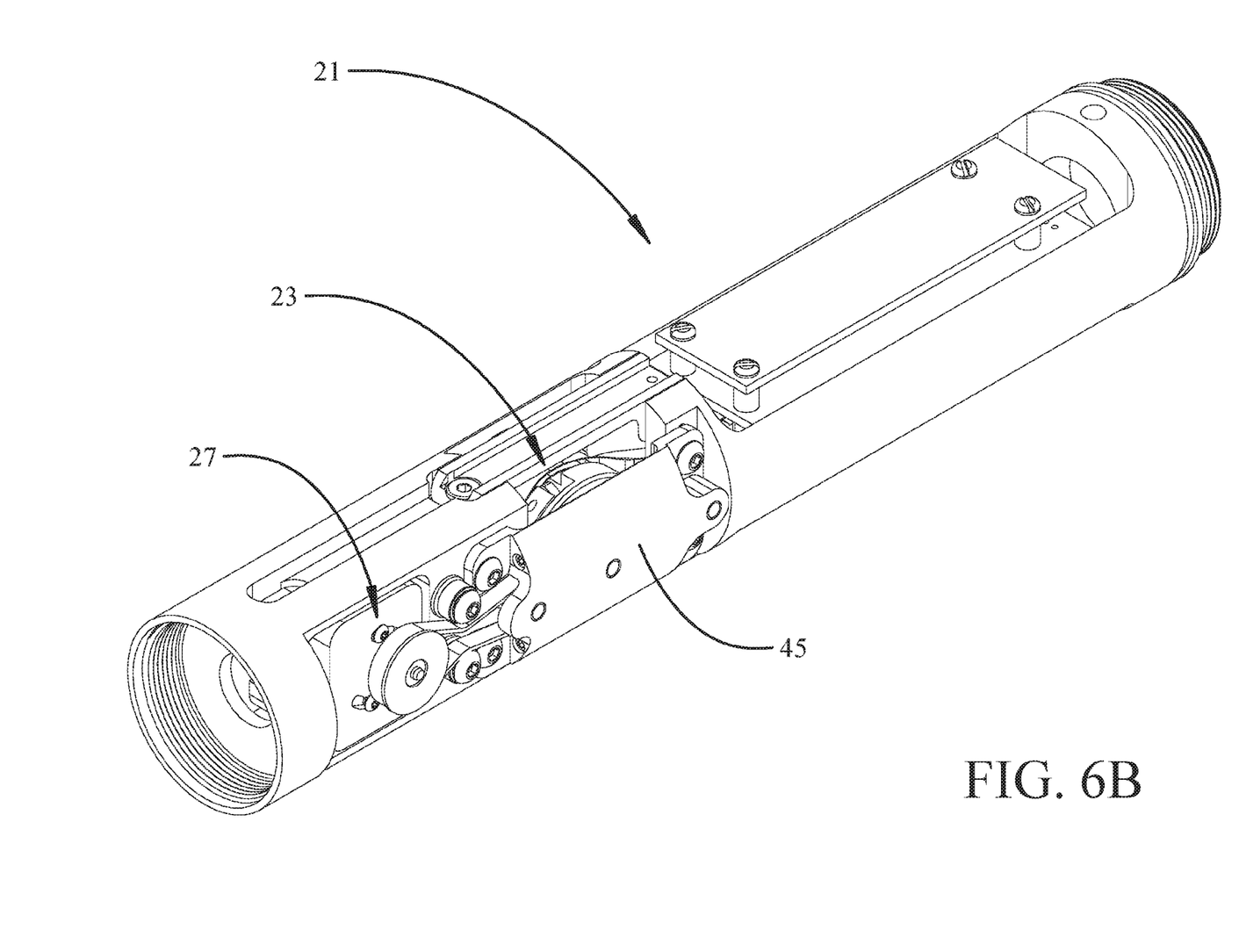
FIG. 6B is a pictorial representation of the sensor gimbal system.
Figure 7A:
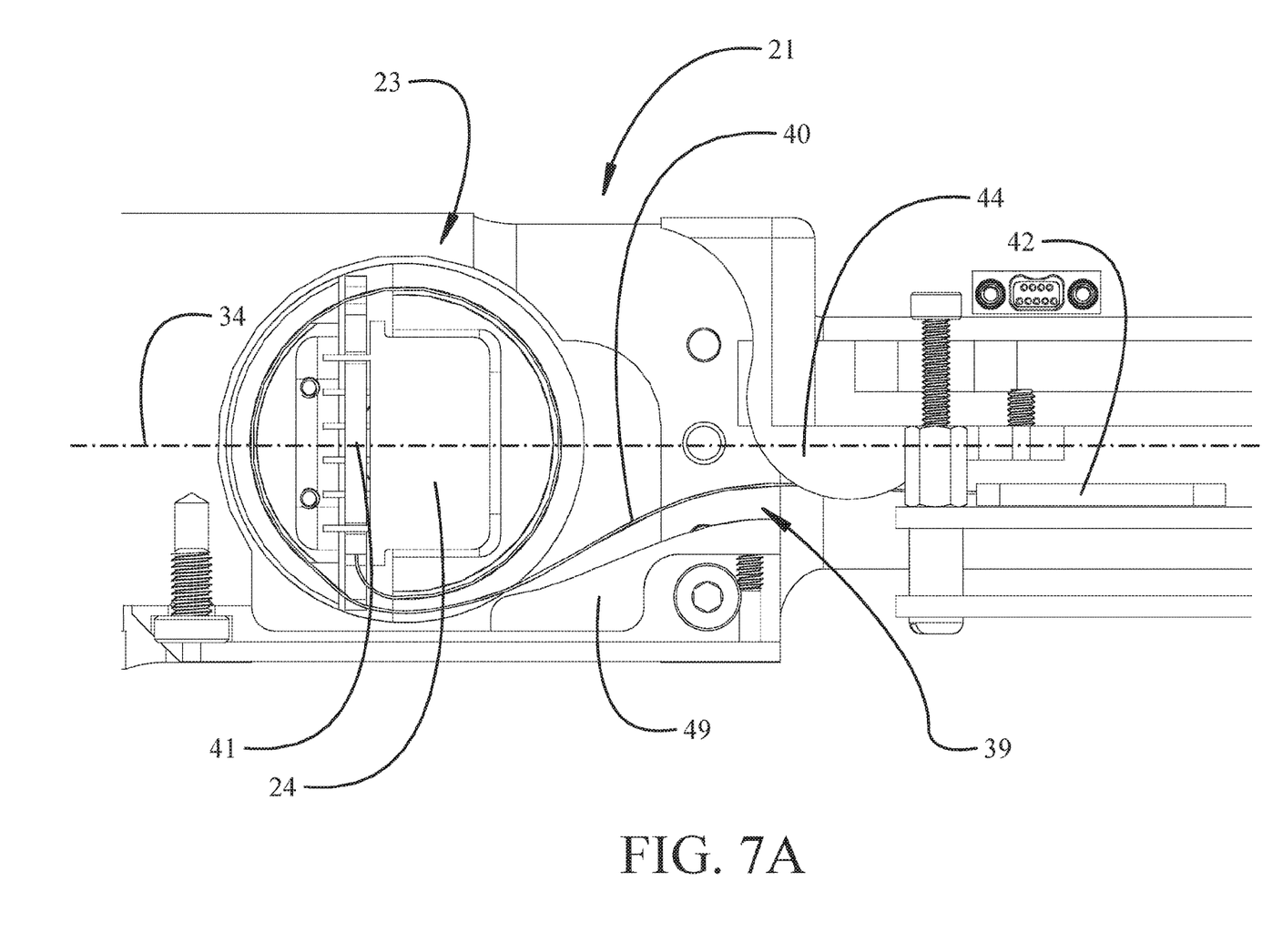
FIG. 7A is a sectioned depiction of the second implementation of the sensor gimbal with the gimbal in an unrotated position.
Figure 7B:
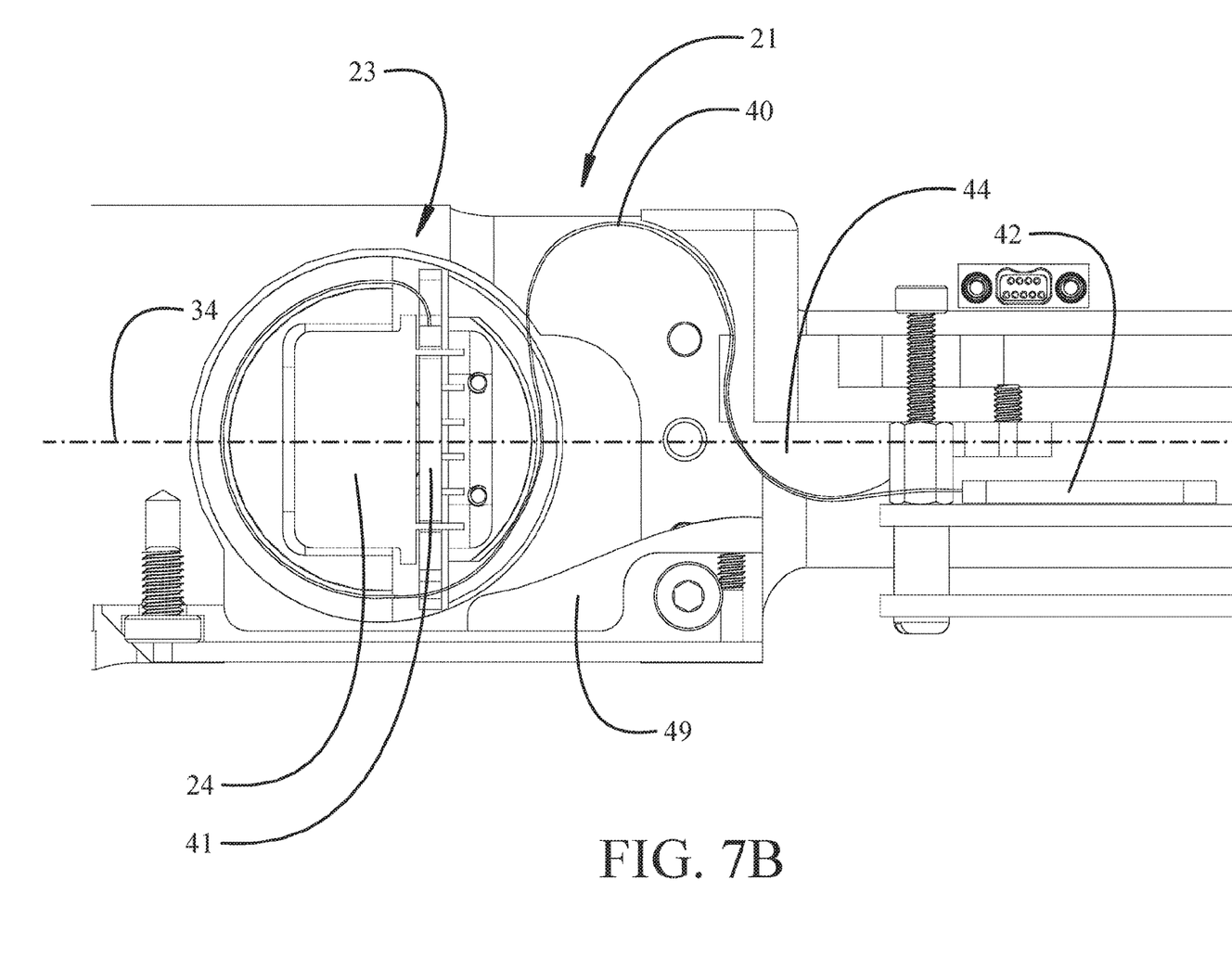
FIG. 7B is a sectioned depiction of the second implementation of the sensor gimbal with the gimbal in a 180° rotated position.

In alternative implementations, the sensor gimbal can be mounted off the IMU gimbal unit 12 on the tool chassis of the survey instrument 10 or on an outer rotating assembly. A second example implementation is seen in FIGS. 6A and 6B wherein a sensor gimbal system 21 is engaged in the survey instrument 10 separate from the IMU gimbal 12. As seen in detail in FIGS. 7A, 7B and 8A-8C, as in the prior implementation, the sensor gimbal system 21 includes one sensor gimbal 23 on which a sensor 24 (that again comprises a Z gyro in the example) is mounted. The sensor gimbal 23 is configured to orient the sensitive axis 34 of the sensor 24 in a first orientation +Z (as seen in FIG. 7A) or, after full rotation, a second orientation −Z (as seen in FIG. 7B) for a first position and second position. A sensor motor assembly 27, best seen in FIG. 9, rotates a toothed drive belt 29 that engages a mating toothed gear 31 to rotate the sensor gimbal 23 between two adjustable hard stops 33, 37. Idler pulleys 50 maintain tension in the drive belt 29. As in the prior implementation a dowel pin 38 integral with the sensor gimbal frame 43 is employed to engage the hard stops 33, 37 and, as in the initial implementation, the hard stops are threaded screws in the gimbal system case 45 or a case cover allowing adjustment of the stop positions.

In alternative implementations, a rotation sensor may be employed to sense position of the sensor gimbal 23 and control sensor motor assembly 27 for rotation of the gimbal to the desired positions.

As in the initial implementation, flex circuit 39 connects the sensor 24 through a flex cable 40 from sensor PCB 41 to electronic circuit board 42. In the example implementation, the flex cable 40 is shielded on both sides by a layer of high magnetic permeability material that prevents the signals from being corrupted from the change in position from one position to another. In the example implementation the high magnetic permeable material is a foil tape such as Mu-ferro foil & tape 3208 series produced by Holland Shielding Systems BV, Jacobus Lipsweg 124, 3316BP Dordrecht, the Netherlands. In alternative implementations, the flex cable may have a full shield on all sides, full shield on one side or partial shielding in specific locations to avoid signal corruption. The flex cable is also routed and managed during rotation and where possible to maintain a large and consistent clearances to minimize the magnitude of parasitic coupling and therefore analogue signal distortion.

Figure 9:
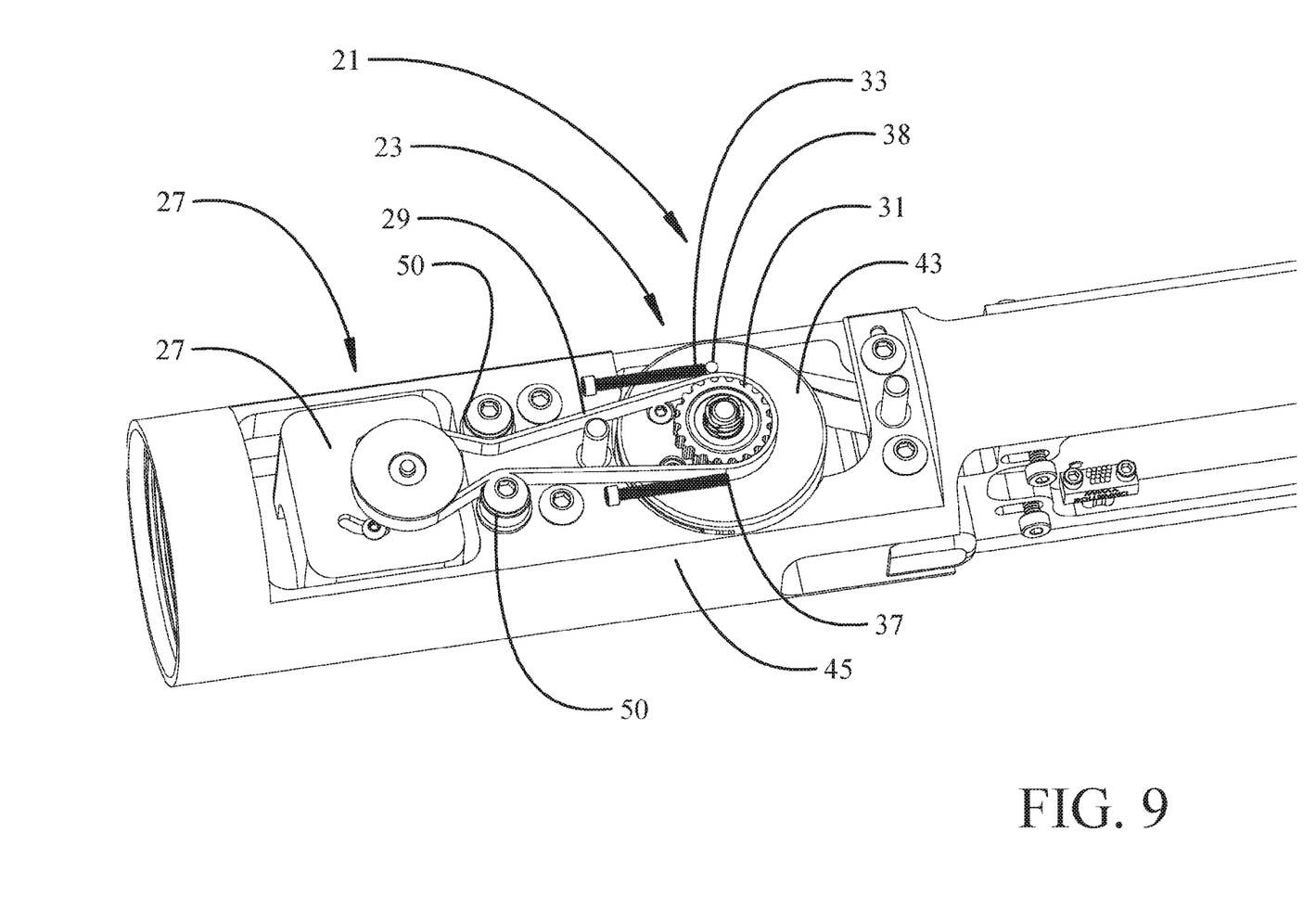
FIG. 9 is a detailed pictorial view of the motor assembly and rotational drive elements; and, FIG. 10 is a flow chart of a manufacturing method for the implementations described herein.

As in the initial implementation, the flex cable 40 is managed to route along a curved path frame 44 during rotation (as seen in FIGS. 7A and 7B) ensuring that the flex cable 40 does not kink preventing mechanical and electrical failure of the conductors. A supplemental path ramp 49 is employed for positioning of the flex cable 40 in the unrotated position as seen in FIG. 7A. To accommodate the rotation of the sensor gimbal 23 through 180° the flex cable 40 incorporates a substantially 360° encirclement of the sensor 24 and sensor PCB 41 in the unrotated position, being received in a track 49a in a sub-chassis 48 engaging the sensor PCB 41 (seen in detail in FIG. 9C) to the sensor gimbal frame 43. In the example implementation a companion track 48B is present in the sensor gimbal frame 43 for alignment of the flex cable 40. The flex cable 40 may be adhesively engaged in the companion track 48B to maintain appropriate tension for shaping of the flex cable in the rotated position of the gimbal as seen in FIG. 7B.

Figure 8A:
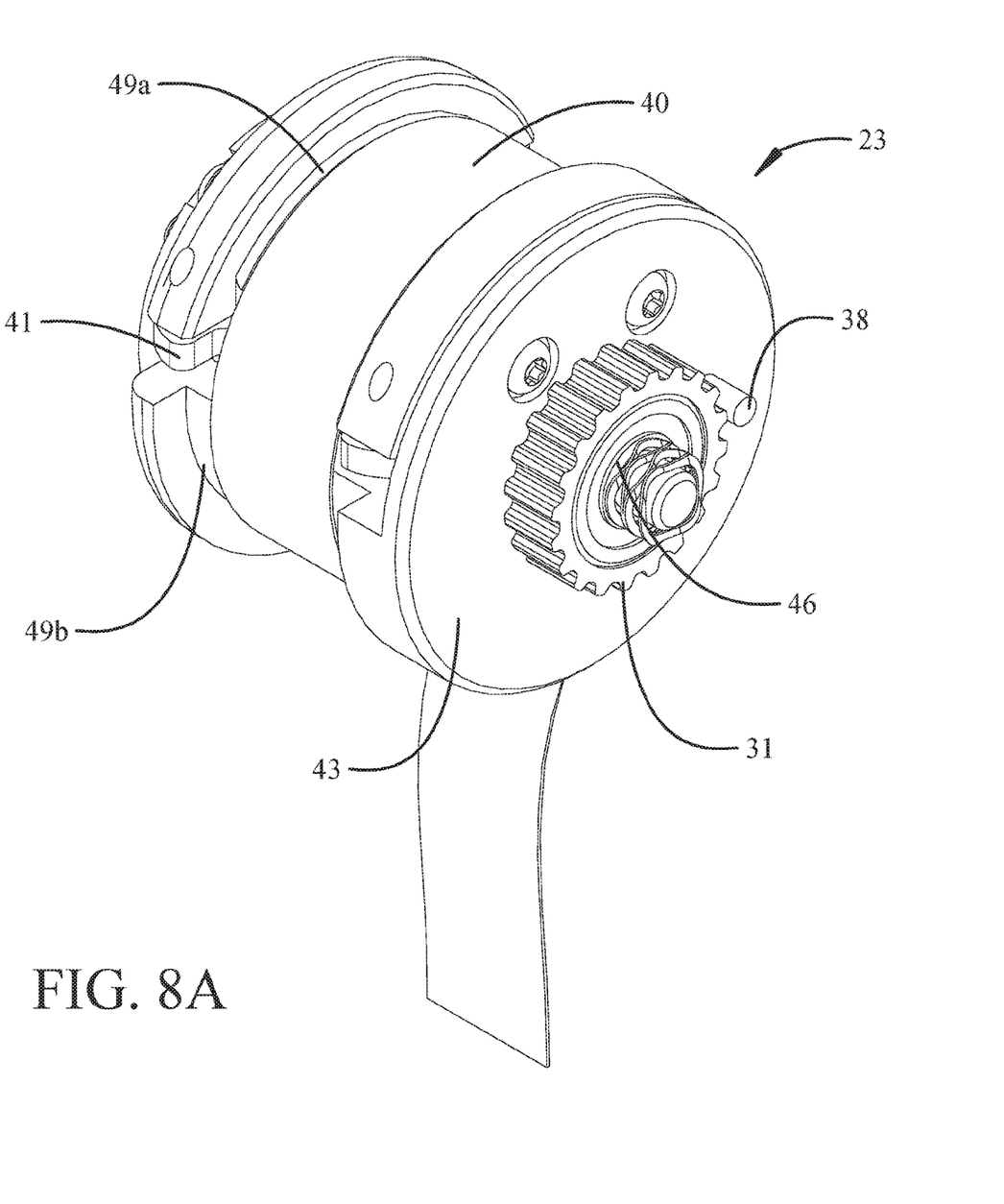
FIG. 8A is a detailed pictorial view of the sensor gimbal.
Figure 8B:
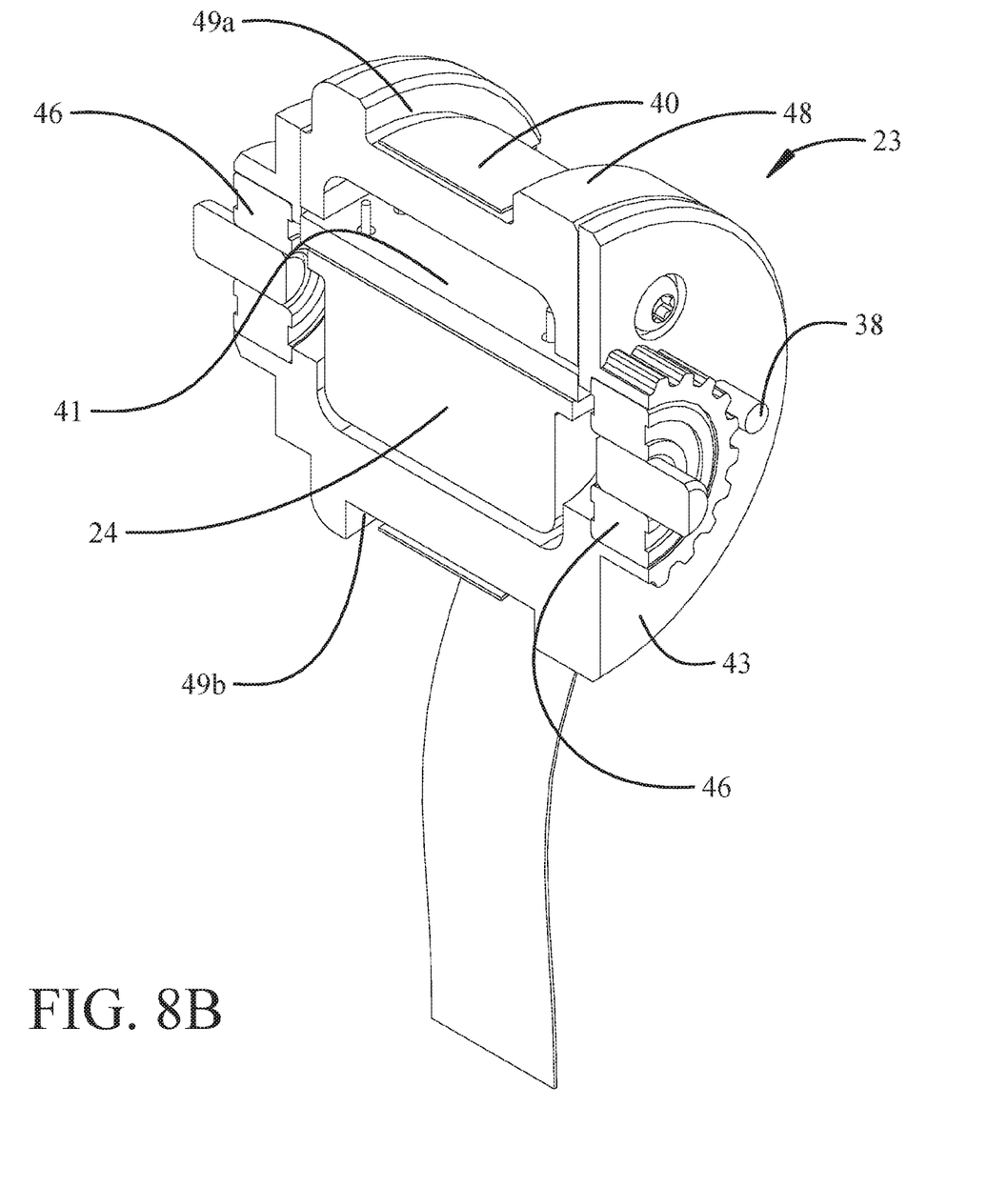
FIG. 8B is a section pictorial view of the sensor gimbal.
Figure 8C:
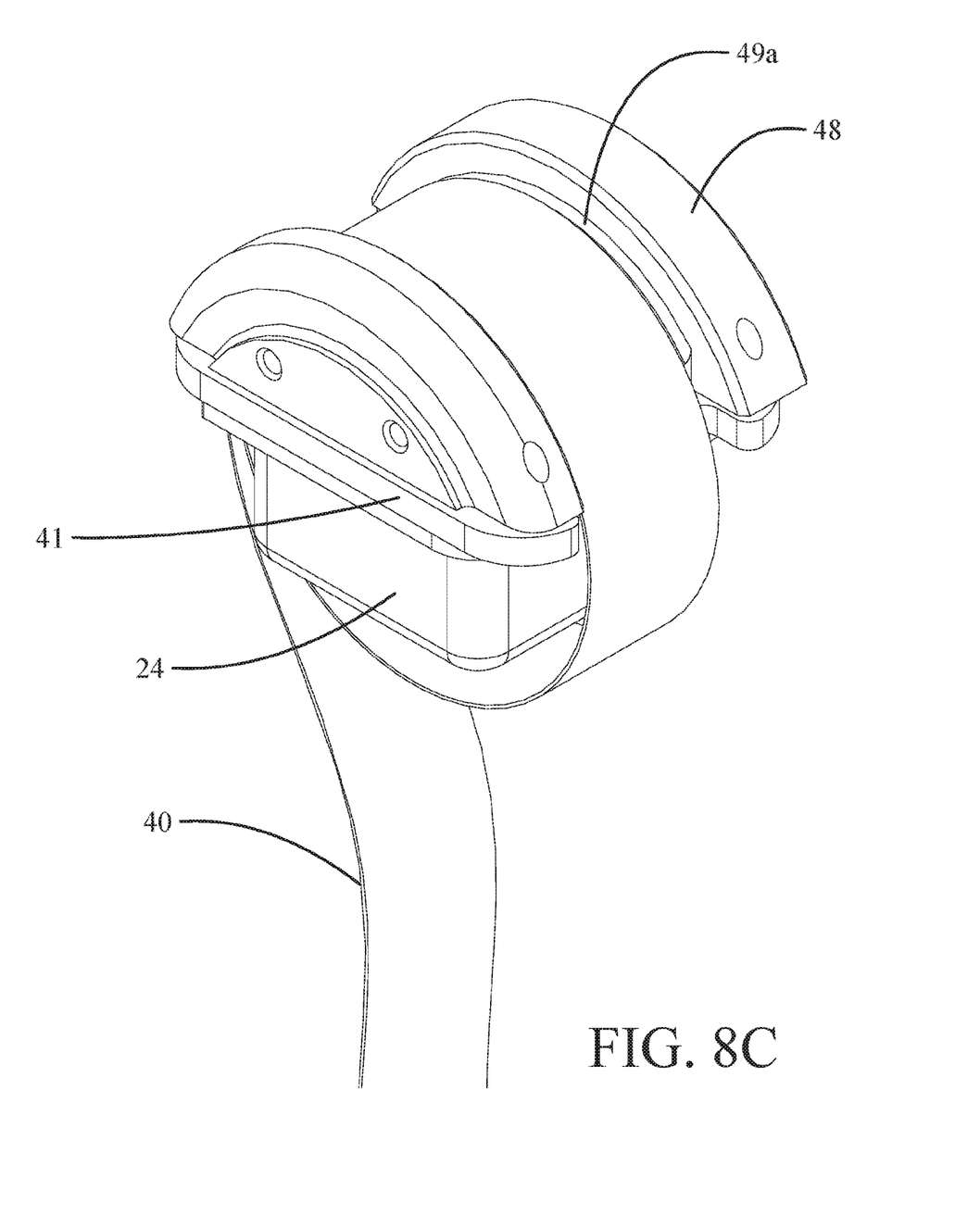
FIG. 8C is a detailed pictorial view of the sensor flex cable PCB mounted in a gyro plate for engagement in the sensor gimbal.

As in the prior implementation, angular contact ball bearings 46 or similar bearings provide rotational support for the sensor gimbal 23. As seen in FIGS. 8A and 8B, bearings 46 are supported in the gimbal frame 43

The sensor 24 used can be a gyroscope, an accelerometer, a magnetometer or a combination of more than one of these types of sensors. The preferred embodiment, as in the initial implementation, uses a MEMS gyroscope, and\or a MEMS accelerometer mounted on the sensor gimbal 22. But the implementation are not limited to these devices. In addition, packaging of the digital and analog electronics for the sensor may be selectively distributed between the sensor PCB 41 and the electronic circuit board 42. In certain implementations the digital and analog electronics as well as the sensor are engaged on the sensor PCB 41 to rotate with the sensor gimbal 22 thereby further reducing potential signal corruption in the flex cable which then only transmits final digital sensor data to data acquisition components on the electronic circuit board 42 for uphole transmission. For sizing considerations in the rotating element, analog circuitry may be consolidated on the sensor PCB 41 with digital components remaining on the electronic circuit board 42 and the flex cable 40 connecting analog to digital signals. To provide the smallest rotating element only the sensor 24 is mounted on the sensor PCB 41 for attachment to the gimbal frame 43.

Figure 10:
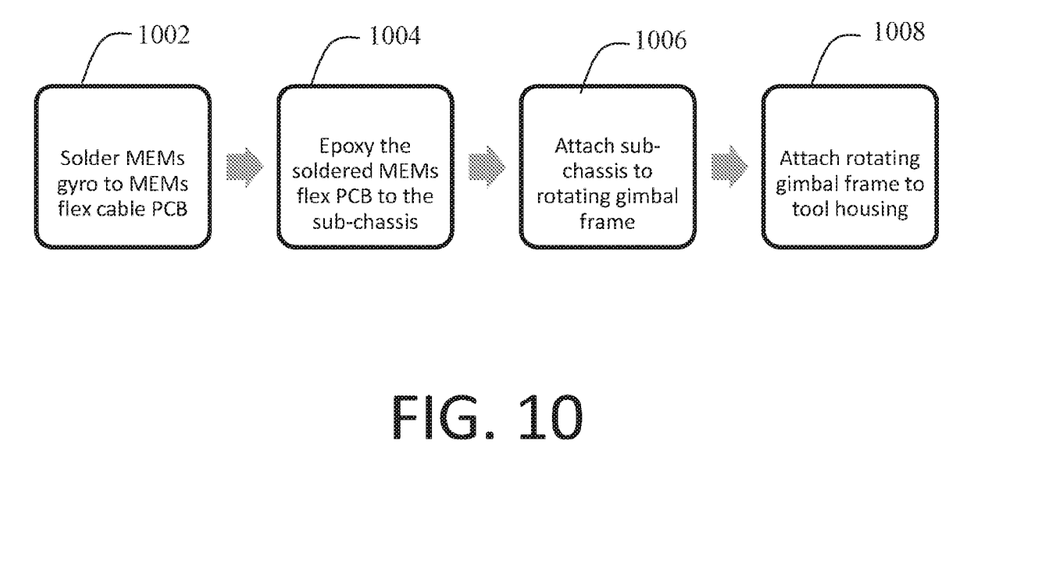

A method for manufacture 1100 of the rotating sensor gimbal system 20 is accomplished as shown in FIG. 10 for a MEMs gyro as the sensor 24. The flex circuit design has two circuit boards (PCBs) on either side of the flex cable 40, namely the MEMs sensor PCB 41 and the electronics circuit board 42. The MEMs gyro sensor 24 is soldered to MEMs sensor PCB 41, step 1002.

The sensor 24, soldered to the MEMS flex PCB in step 1102, is attached to the sub-chassis 48 using a silicon adhesive, step 1104. The silicon adhesive is to isolate the MEMs gyro from vibration and stresses caused by the rotating gimbal. These vibrations and stresses can produce unwanted bias shift during gimbal rotation.

The sub-chassis 48 is attached to the gimbal frame 43 (seen in FIG. 4 for the first implementation and FIG. 9C for the second implementation) of the rotating sensor gimbal 22, 23, step 1106. Including a sub-chassis allows for ease of manufacture. The MEMs gyro is soldered to the MEMs flex PCB first (Step 1002) and then glued to the sub-chassis (step 1004). By taking care during this process, the MEMs is isolated from unnecessary vibrations and stresses.

The rotating gimbal frame is attached in a housing of the survey instrument, step 1008, and calibration of the rotating gimbal is performed.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A sensor gimbal system comprising:
   a sensor gimbal with a sensor PCB and a sensor, said sensor gimbal configurable to rotationally orient a sensitive axis of the sensor with respect to the sensor gimbal system;
   a sensor motor to rotate the sensor gimbal between a first orientation and a second orientation;
   an electronic circuit board, and
   a flex circuit between the sensor PCB and the electronic circuit board, the flex circuit incorporating a 360° encirclement of the sensor and the sensor PCB in the first orientation,
   wherein the flex circuit is received in a track in a sub-chassis engaging the sensor PCB to a sensor gimbal frame, and the flex circuit is routed to reduce signal distortion and/or kinking during rotation.

2. The sensor gimbal system according to claim 1 wherein the sensor is mounted to the sub-chassis with an epoxy, or a silicon adhesive, the sub-chassis attached to the sensor gimbal frame of the sensor gimbal.

3. The sensor gimbal system according to claim 1 wherein the sensor comprises a MEMs gyro.

4. A method for manufacture of the sensor gimbal system according to claim 3, the method comprising:
   soldering the MEMs gyro sensor to the sensor PCB;
   epoxying or silicon adhering the soldered sensor PCB to the sub-chassis;
   attaching the sub-chassis to the sensor gimbal frame; and
   attaching the sensor gimbal frame to a tool housing and calibrating the sensor gimbal system.

5. The sensor gimbal system according to claim 1 wherein a companion track is present in the sensor gimbal frame for alignment of the flex circuit.

6. A survey instrument comprising the sensor gimbal system according to claim 1.

7. The survey instrument according to claim 6 further comprising an IMU gimbal, wherein the sensor gimbal system is mounted on the IMU gimbal.

8. The survey instrument according to claim 7 wherein the IMU gimbal is rotatable about a longitudinal axis of the survey instrument.

9. The survey instrument according to claim 8 wherein the survey instrument has a tool chassis, and the sensor gimbal system is mounted on the tool chassis.

10. The sensor gimbal system according to claim 1 comprising a curved path frame, wherein the flex circuit is routed on the curved path frame to reduce signal distortion and/or kinking during rotation.

11. The sensor gimbal system according to claim 1 further comprising shielding on one or both sides of the flex circuit.

12. The sensor gimbal system according to claim 1 wherein the sensor is mounted using epoxy or a silicon adhesive to isolate vibrations and stresses from rotation of the sensor gimbal.

13. The sensor gimbal system according to claim 1 wherein the flex circuit, curved path routing, shielding and/or silicon adhesive reduce bias.

14. The sensor gimbal system according to claim 1 mounted on
   an IMU gimbal,
   tool chassis of a survey instrument, or
   an outer rotating assembly.

15. The sensor gimbal system according to claim 1 comprising a supplemental path ramp for positioning the flex circuit in the first orientation.

16. A sensor gimbal system comprising:
   a sensor gimbal with a sensor PCB and a sensor, said sensor gimbal configurable to rotationally orient a sensitive axis of the sensor with respect to the sensor gimbal system;
   a sensor motor to rotate the sensor gimbal between a first orientation and a second orientation;
   an electronic circuit board;
   a flex circuit comprising a flex cable between the sensor PCB and the electronic circuit board; and
   a curved path frame,
   wherein the flex cable is routed on the curved path frame to reduce signal distortion and/or kinking during rotation.

17. The sensor gimbal system according to claim 16 comprising a supplemental path ramp for positioning the flex cable in the first orientation.

18. A sensor gimbal system comprising:
   a sensor gimbal with a sensor PCB and a sensor, said sensor gimbal configurable to rotationally orient a sensitive axis of the sensor with respect to the sensor gimbal system,
   a sensor motor to rotate the sensor gimbal between a first orientation and a second orientation,
   an electronic circuit board,
   a flex circuit between the sensor PCB and the electronic circuit board, the flex circuit incorporating a 360° encirclement of the sensor and the sensor PCB in the first orientation, and
   a supplemental path ramp for positioning the flex circuit in the first orientation, wherein the flex circuit is routed to reduce signal distortion and/or kinking during rotation.

19. A sensor gimbal system according to claim 18, further comprising a curved path frame, wherein the flex circuit is routed on the curved path frame to reduce signal distortion and/or kinking during rotation.

\* \* \* \* \*